(12) United States Patent
Mitterreiter et al.

(10) Patent No.: US 7,395,052 B2
(45) Date of Patent: Jul. 1, 2008

(54) PROCESS OF SENDING ACCESS DATA TO A VEHICLE MOUNTED SUBSCRIBER STATION FOR A SPECIAL ACCESS MODE TO A SERVICE PROVIDER STATION

(75) Inventors: Ilse Mitterreiter, Unterhaching (DE); Thomas Diessel, Ottobrunn (DE); Thorsten Lange, Hamburg (DE); Michael Fischer, Muecke (DE); Michael Bueter, Duesseldorf (DE); Frank Ulke, Recklinghausen (DE)

(73) Assignees: Bayerische Motoren Werke Aktiengesellschaft, Munich (DE); Siemens Aktiengesellschaft, Munich (DE)

( * ) Notice: Subject to any disclaimer, the term of this patent is extended or adjusted under 35 U.S.C. 154(b) by 1035 days.

(21) Appl. No.: 10/786,170

(22) Filed: Feb. 26, 2004

(65) Prior Publication Data

US 2006/0143097 A1 Jun. 29, 2006

Related U.S. Application Data

(63) Continuation of application No. PCT/EP02/08966, filed on Aug. 9, 2002.

(30) Foreign Application Priority Data

Aug. 29, 2001 (DE) ................ 101 42 193

(51) Int. Cl.
*H04M 3/42* (2006.01)
*H04Q 7/22* (2006.01)
(52) U.S. Cl. .............. 455/414.1; 455/550.1; 455/569.2; 455/575.9; 455/99; 455/3.04
(58) Field of Classification Search .............. 455/414.1, 455/550.1, 569.2, 575.9, 99, 3.04
See application file for complete search history.

(56) References Cited

U.S. PATENT DOCUMENTS

| 2003/0134648 | A1* | 7/2003 | Reed et al. | 455/456 |
| 2005/0143064 | A1* | 6/2005 | Pines et al. | 455/428 |
| 2005/0288013 | A1* | 12/2005 | Pines et al. | 455/432.3 |

(Continued)

FOREIGN PATENT DOCUMENTS

DE 100 09 844 A1 3/2000

(Continued)

*Primary Examiner*—Joseph Feild
*Assistant Examiner*—S. Smith
(74) *Attorney, Agent, or Firm*—Crowell & Moring LLP

(57) ABSTRACT

A process provides access data to a transportable subscriber station, for establishing access to a service provider station. A first access mode which can be provided using first access data includes a first network that is accessible by means of a selectable network account, a first switching station, and a second network. A second access mode can be provided by means of second access data by way of the first network and a fixedly defined second switching station. If first access data for the selected network account are not available a request for the second access mode is made to the service provider station, using the stored second access data, and a request is made for first access data for the selected network account in the second access mode. This requested access data for the selected network account are transmitted to the subscriber station in the second access mode and stored for the selected network account in the subscriber station.

18 Claims, 6 Drawing Sheets

U.S. PATENT DOCUMENTS

2007/0036306 A1* 2/2007 Pines et al. ............ 379/114.01
2007/0129063 A1* 6/2007 Recio et al. .............. 455/414.1

FOREIGN PATENT DOCUMENTS

| | | | |
|---|---|---|---|
| DE | 100 40 798 | A1 | 8/2000 |
| DE | 100 53 493 | A1 | 10/2000 |
| EP | 0 679 040 | A3 | 10/1995 |
| EP | 1 225 745 | A3 | 12/2001 |
| WO | WO 98/23108 | | 5/1998 |
| WO | WO 00/41421 | | 7/2000 |

* cited by examiner

PROCESS OF SENDING ACCESS DATA TO A VEHICLE MOUNTED SUBSCRIBER STATION FOR A SPECIAL ACCESS MODE TO A SERVICE PROVIDER STATION

CROSS-REFERENCE TO RELATED APPLICATIONS

This application is a CONTINUATION of PCT Application No. PCT/EP02/08966 filed on Aug. 9, 2002.

BACKGROUND OF THE INVENTION

This application claims the priority of German patent document 101 42 193.1, filed 29 Aug. 2001 (29.08.2001), the disclosure of which is expressly incorporated by reference herein.

The present invention relates to a process of sending access data to a subscriber station, for a special access mode to a service provider station. Although it can be used for subscriber stations in many different environments, the invention and the problems which it addresses will be explained with respect to a subscriber station situated in a motor vehicle.

In systems of this type, the access data are used for implementing an indirect access mode to a service provider station, via a wireless network, by means of a network account that can be selected by the subscriber station via a first switching station, over the INTERNET. In addition, an alternative direct access mode is to be provided using stored access data, via the wireless network and a fixedly defined second switching station of the motor vehicle manufacturer. Conventionally, however, the indirect access mode is to be the default case, while the direct access mode is to be used only in exceptional cases.

In such systems, the problem arises the access data are required for the indirect access mode must be changeable, specifically as a function of the wireless network account or network provider used by the motor vehicle. One possibility for providing the respective required access data would be to have the user input these access data into the subscriber device. However, this possibility is inconvenient and susceptible to errors.

It is therefore an object of the present invention to provide a process of sending access data to a subscriber station, particularly situated in a motor vehicle, for a special access mode to a service provider station, which process can adapt itself to changeable special access data.

SUMMARY OF THE INVENTION

In contrast to the prior art, in the process according to the invention, no user input is required for the special access data. Rather, first access data are made available automatically, without intervention by the driver himself In a first preferred embodiment of the invention, a first (indirect) access mode can be provided by establishing a first connection from the subscriber station to a first switching station, via a first network, and a second connection from the first switching station to the service provider station, via a second network, using the first (indirect) access data.

According to the invention, the second (direct) access mode can be provided by establishing a third connection from the subscriber station to a second switching station via the first network, and a fourth connection from the second switching station to the service provider station, using second (direct) access data.

According to the invention, the first network may be a radio network, particularly a mobile telephone network, and the first access data may comprise a mobile telephone number.

According to another feature of the invention, the first switching station may be a switching station of the network provider which provides the network account that can be dialed by way of the mobile telephone number.

According to another feature of the invention, the second network may be a global network, such as the INTERNET, and the first access data may comprise an INTERNET address. Moreover, the first access data may comprise a user identification and a password.

According to another preferred embodiment of the invention, immediately after storage of the transmitted first access data for the selected network account in the subscriber station, the second access mode is interrupted, and the first access mode to the service provider station is requested by means of the stored first access data.

According to another feature of the invention, after the occurrence of at least one predefined error in the request for the first access mode to the service provider station by means of the stored first access data, the stored first access data are cancelled, and a new request for first access data for the selected network account is made in the second access mode.

According to the invention, the subscriber station may be situated in a motor vehicle; the second access data may include a mobile telephone number; and the second switching station may be a switching station of the motor vehicle manufacturer, which can be dialed via the mobile telephone number.

According to another feature of the invention, a first storage device may be provided in the form of a table memory which can store a defined number of sets of first access data, and is described according to the FIFO principle.

According to another feature of the invention, an expiration date is automatically assigned to the sets of first access data, on which expiration date the respective set is automatically canceled. The expiration date may be a function of the first access data.

According to another feature of the invention, it is automatically implemented after the insertion of a SIM card and a logging into the telephone network.

The same first access data may also be provided for different network accounts of the same network provider.

Other objects, advantages and novel features of the present invention will become apparent from the following detailed description of the invention when considered in conjunction with the accompanying drawings.

DETAILED DESCRIPTION OF THE DRAWINGS

In the figures, identical reference numbers indicate the same components or components having the same function.

Figure 1:
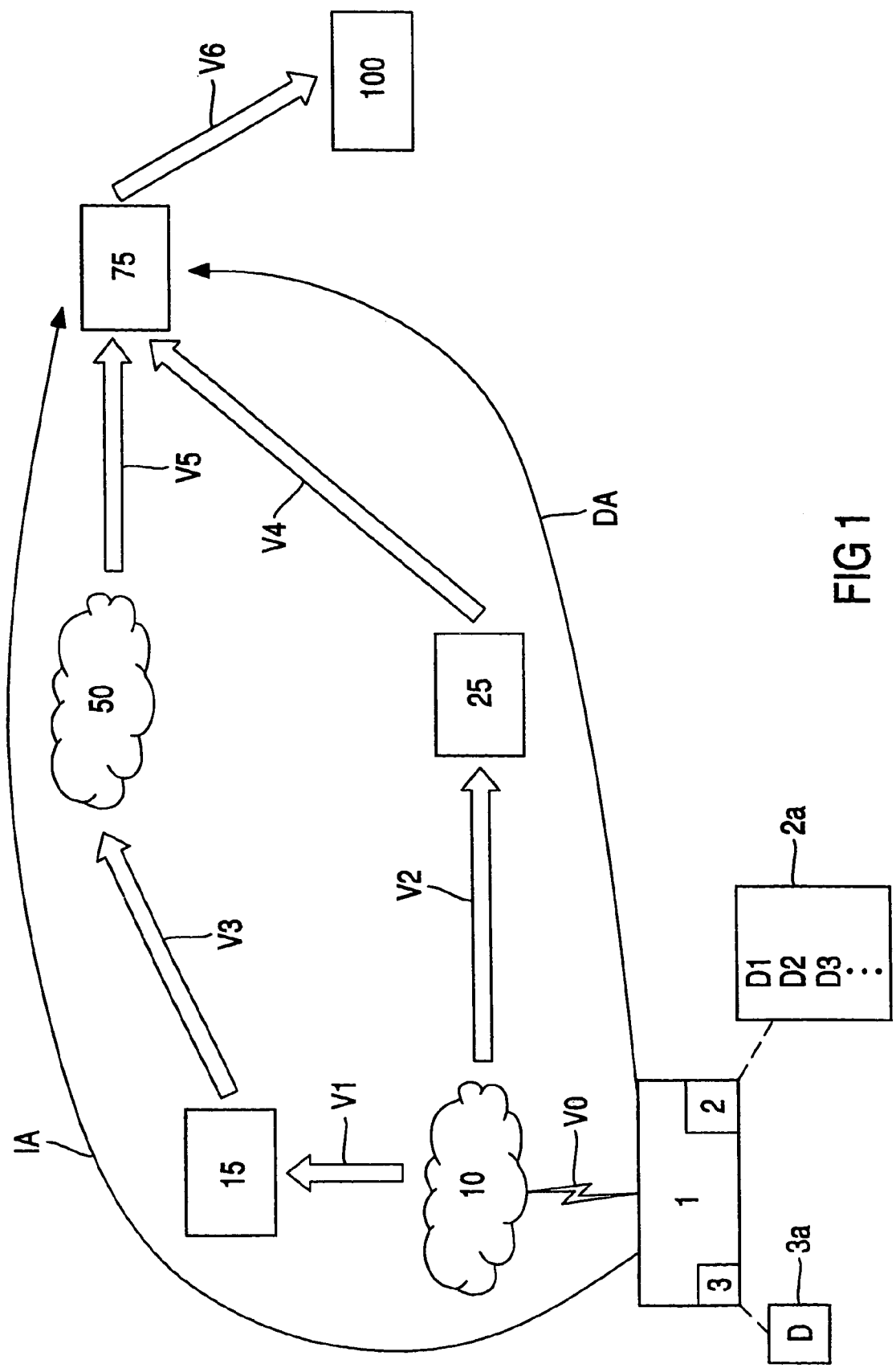
FIG. 1 is a schematic representation of a system for explaining an embodiment of the process according to the invention.

FIG. 1 is a schematic view of a system for explaining an embodiment of the process according to the invention.

In FIG. 1, reference number 1 indicates a subscriber station which is situated in a motor vehicle (not shown). The subscriber station 1, which can be operated by the user of the motor vehicle by means of a corresponding operating device, such as a joystick or a rocker, contains a browser that controls the operation of the subscriber station 1 and its external contacts with service provider stations 75.

Reference number 2 in FIG. 1 indicates a first storage device in which a table 2a where the first access data D1, D2, D3, . . . are stored. Reference number 3 indicates a second storage device which has an area 3a in which second access data D are stored. The significance of these first and second access data is in different access modes to the service provider station 75 which, in the present case, is a WAP gateway which permits an access to a WAP portal 100. In the following, the above-mentioned access modes are called the first (indirect) access mode IA and the second (direct) access mode DA, as indicated in FIG. 1 by corresponding arrows.

Furthermore, in FIG. 1, reference symbols V0-V6 indicate connection branches; reference number 10 indicates a mobile network in the form of the GSM network; reference number 15 indicates the switching station of the mobile network provider, for example, of the D1 (as per Table 2a) network; reference number 25 indicates a switching station of the automobile manufacturer; and reference number 50 indicates the Internet.

In the above-described embodiment of the process according to the invention, the first (indirect) access mode IA is the default access mode for the service provider station in the form of the WAP gateway 75; whereas the second (direct) access mode DA is used by the browser only in special cases (for example, for initial configuration, or in cases in which the Internet 50 is not available).

The reason is that the second (direct) access mode DA usually is an uncertain access mode with a limited capacity. It also becomes expensive when the motor vehicle with the subscriber station 1 is in a foreign country, because a corresponding connection via the mobile network 10 and the connection branches V0, V2 requires a long-distance connection.

In contrast, the first, indirect access mode IA is cost-effective, even in a foreign country, because the subscriber station 1 can dial into the switching station 15 of the network operator via the mobile network 10 and the connection branches $V_0, V_1$, using a local connection. From there, it can reach the Internet 50 in a cost-effective manner, by way of the connection branch V3, and further can reach the service provider station 75 by way of the connection branch V5.

However, in this context, the problem arises that changing access data D1, D2, D3, . . . are required for the first, indirect access mode IA, specifically as a function of which mobile network account or network provider is used. In other words, in the D1 network, a different mobile telephone number and URL address are required for an Internet access than in the OMNITEL network.

One possibility of providing the respectively required access data D1, D2, D3, . . . would be to have the user of the subscriber device 1 input them each time. However, this possibility is inconvenient because, as a rule, the operating device is poorly suited for this purpose. That is, it is susceptible to errors and represents a safety problem. The above-described embodiment therefore provides that the first access data D1, D2, D3 be automatically made available to the table memory 2a of the storage device 2 without need for the user or driver to attend to it himself.

In this regard, it should be noted that the second access data D for the direct access mode DA are defined by the vehicle manufacturer and can be changed only when the vehicle is serviced in the shop. In other words, the user or driver has no access thereto.

It is the core of the above-described embodiment that, after designation of the mobile network provider or of the mobile network account (for example, in the D1 network, after the insertion of a corresponding SIM card and inputting of the PIN code), the subscriber device 1 automatically checks whether corresponding first access data (here, the access data for the D1 network), are present, and if so, a connection is automatically established by means of the first indirect access mode IA to the service provider station 75, here, the WAP gateway.

Only when the corresponding first access data D1 are not present (or in the event of certain, previously defined other disturbances), a connection is established by means of the second, indirect access mode DA to the service provider 75. Thereafter, a request is automatically sent, directly by way of this connection to the service provider 75, to send to the subscriber station 1 corresponding first access data for the mobile network provider which is then currently being used.

Furthermore, according to this embodiment, the subscriber station 1 is designed such that, immediately after the receipt of corresponding access data D1 via the second, direct access mode DA, it interrupts this connection and attempts to dial in by way of the first, indirect access mode IA by means of the received first access data, for example, D1 for the D1 network.

This functional approach permits the first, indirect access mode IA to be used whenever possible, as a default, with the second, direct access mode DA being used only in exceptional cases.

In the following, functional process blocks for the above-described embodiment are explained in detail with reference to FIGS. 2 to 6.

Figure 2:
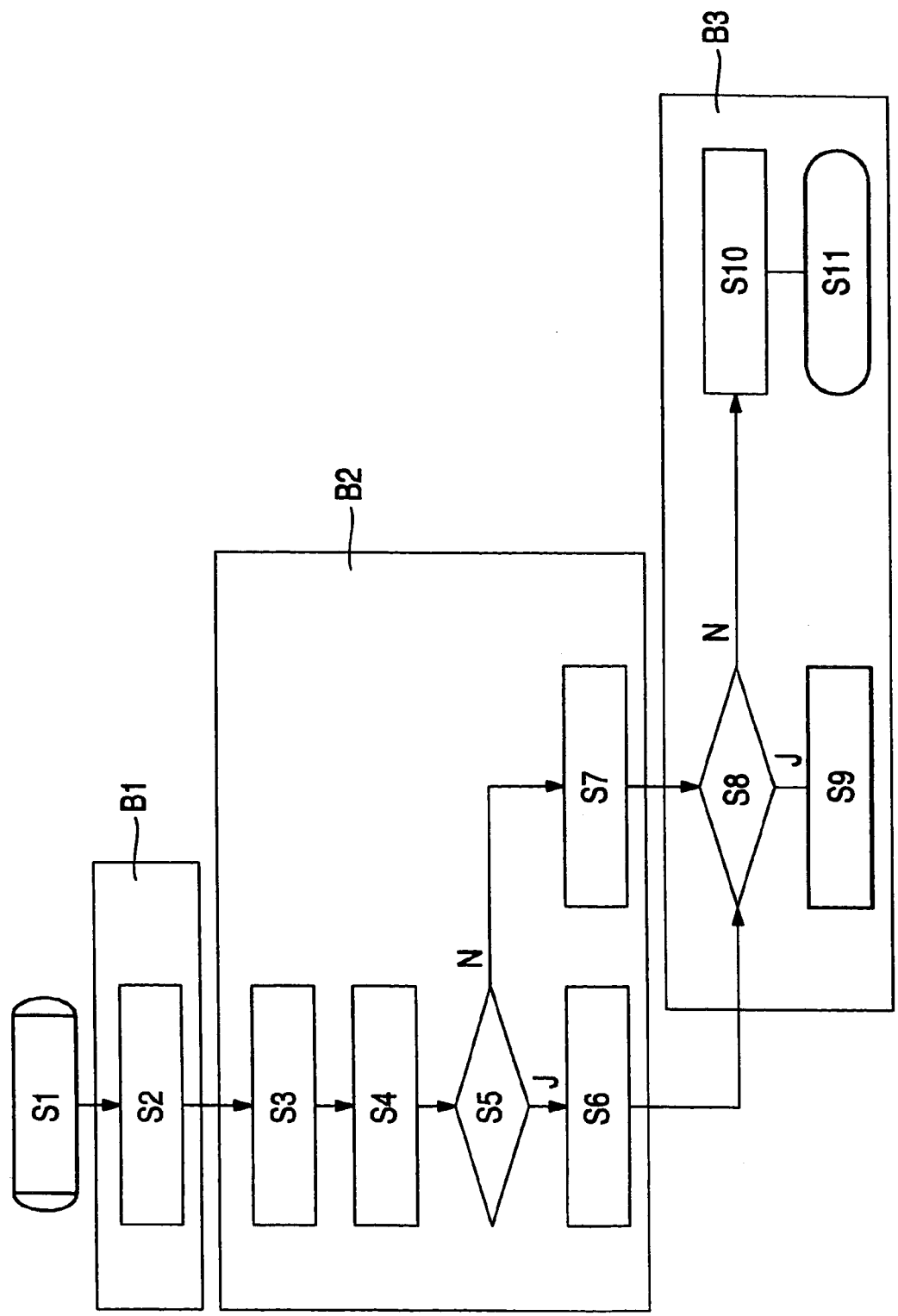
FIG. 2 shows the process steps for starting up the browser provided in the subscriber station according to the described embodiment.

FIG. 2 shows the process steps S1 to S11 for starting-up the browser provided in the subscriber station 1 according to the described embodiment; these steps can be logically combined to three blocks B1, B2, B3.

In step S1, the browser is switched on by switching-on of the power supply of the subscriber station 1 and inputting a corresponding command by means of the operating device, such as a rocker.

In the first block B1, the table 2a of the storage device 2, in which the first access data D1, D2, D3, . . . are stored, is actualized; specifically in the present example, it is checked in step S2 whether certain access data have reached an expiration date also provided in the table 2a. If so, they are erased from the table 2a in step S2.

In the second block B2, it is determined which access data are used for a first access to the service provider station 75, the WAP gateway. For this purpose, the IMSI is first determined from the SIM card of the user of the subscriber station 1 in step S3, and subsequently, in step S4, the MCC code and the MNC code are read. The subscriber station 1 now knows in the country in which it is located, and the identity of the network provider.

In step S5, the procedure can look up in table 2*a* whether corresponding first access data D1, D2, D3, . . . are provided for the particular network provider in the particular country. For example, first access data D1 for the D1 network in Germany.

Depending on whether corresponding first access data are provided, the process flow either branches to step S6, in which the found first access data from table 2*a* are used, or to step S7, in which, because of the absence of first access data, the second access data D for the second, direct access mode DA from the second storage device 3 are used.

In block B3, the availability of the mobile network 10 is checked first since, if it is unavailable, a call can be made in neither the first (indirect) access mode IA nor in the second (direct) access mode DA. For this purpose, the availability of the network is checked in step S8, after which, in the case of a positive result, the process advances to step S21 in FIG. 3 which represents a POP (Point of Presence). If the result of the test in step S8 is negative, the user is informed in step S10 of unavailability of the mobile network 10, and the browser is stopped in step S11.

Figure 3:
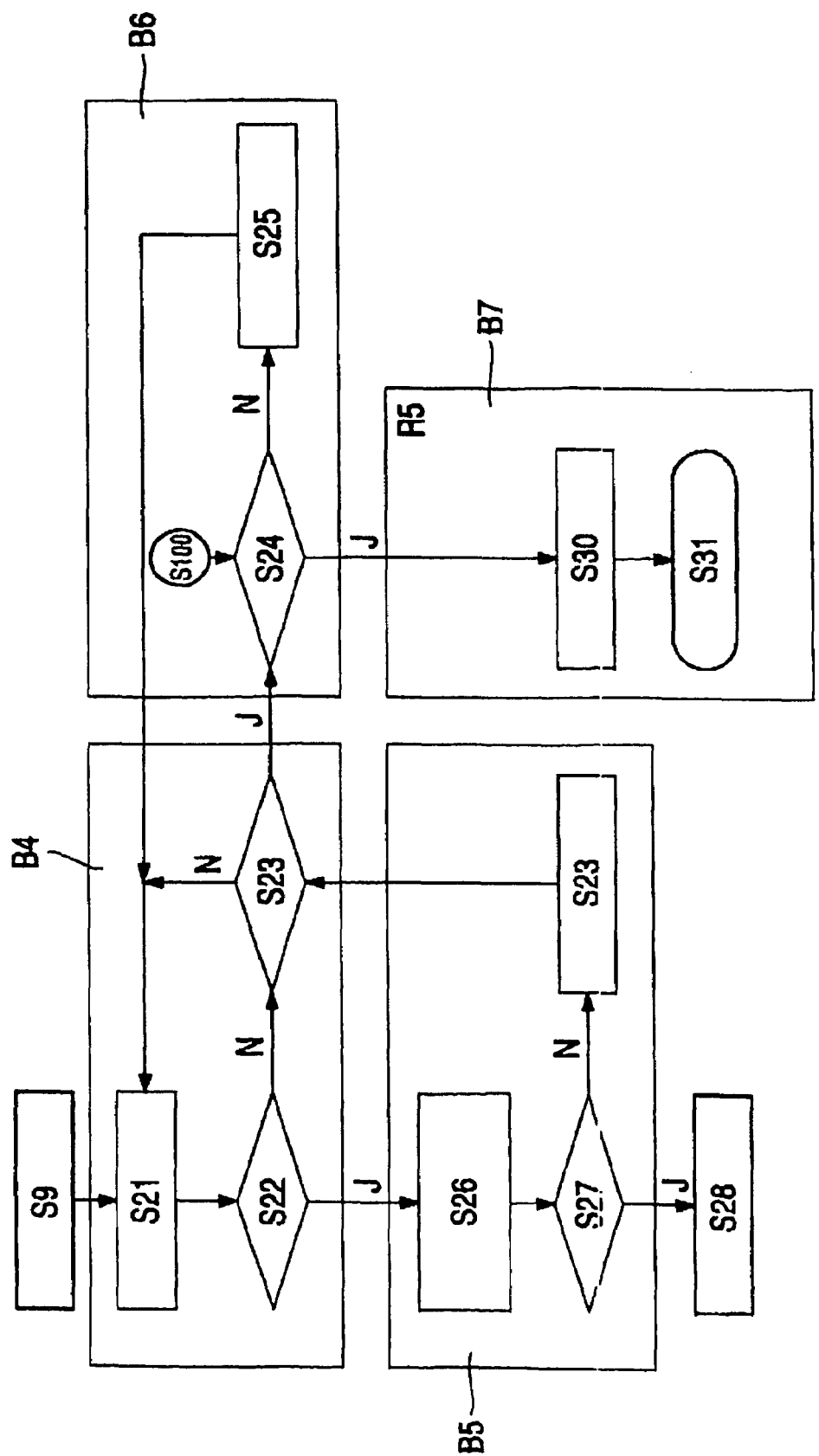
FIG. 3 shows further process steps where a mobile network is available for establishing a connection with the corresponding switching station.

FIG. 3 shows the further process steps for the case of the availability of the mobile network 10 for establishing a connection with the corresponding switching stations 15 or 25. Process steps S21 to S31 can also be logically subdivided into different blocks B4 to B7.

Based on the positive result of step S8 in FIG. 2 (network available), it is first attempted in block B4 to establish a dialing connection according to the first or second access data depending on the result of step S5. It is assumed, for example, that, in the present case, first, indirect access data D are present for the selected network provider, the D1 network in Germany.

In step 21, it is then attempted to establish a dialing connection with the switching station 15 of the D1 mobile network provider by means of the first access data D1.

In step S22, it is determined whether the connection is established. If not, the program branches to step S23 in which a determination is made whether more than one dialing repetition has been implemented. If not, the program returns to step S21 and dialing is repeated. If the result of the check of step S23 is positive (dialing has been repeated) the program branches to block B6, where a check is made in step S24, whether the second access data D were already used for the dialing attempt. Since this was not the case in the present example, the program branches farther to step S25 in which the second access data D are used, and the program then returns to step S21 of block B4 in order to carry out a dialing attempt there by means of the second access data D.

If, on the other hand, in block B4, the second access data D were already used, the program skips from step S24 to block B7, in which the user is informed in step S30 about the failure of the dialing attempt and subsequently the browser is stopped in step S31.

If the dialing attempt in block B4 is successful (for example, by means of the available first access data D1), the program skips from step S22 to step S26 of block B5, where a log-in takes place at the switching station 15 by means of the first access data D1. For this purpose, a user name and a password are normally required. In step S27, it is checked whether the log-in was successful and, if so, it will be possible in step S33 in FIG. 4 for the user to establish a connection with the WAP portal 100 by way of the service provider station 75. If the log-in was unsuccessful, the program skips to step S29 in which the mobile network connection is interrupted, and the process returns to step S23 which initiates the above-described one-time dialing repetition.

For reasons of completeness, it should be noted that, if in step 9 only second access data D are present for establishing the connection, blocks B4 to B7 are passed through analogously in order to establish a connection with the switching station 25.

Figure 4:
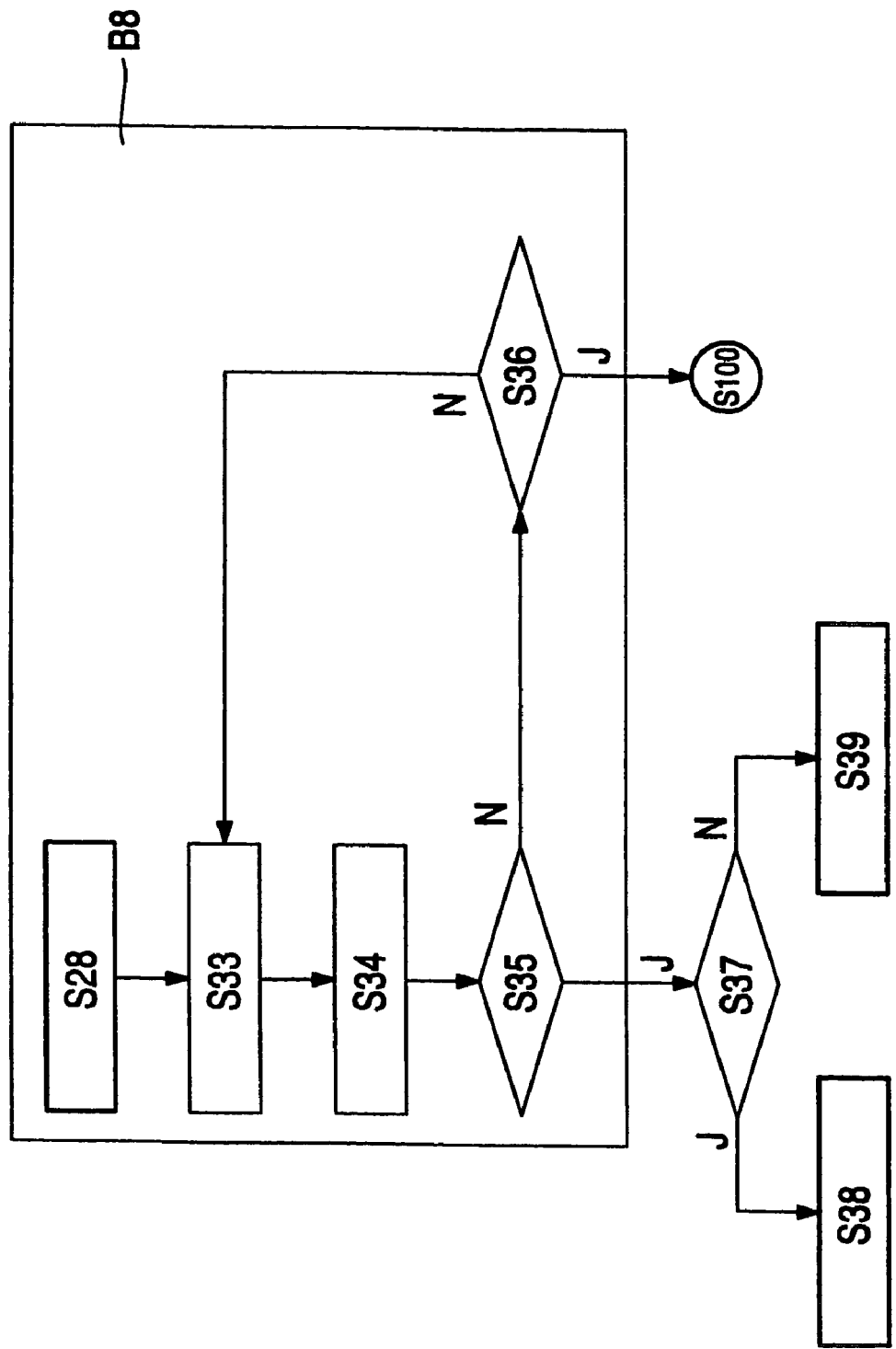
FIG. 4 shows the further course of the process where the user was able to establish a connection to the Internet by way of the switching station.

FIG. 4 shows the further course of the process if, in step S26, the user was able to establish a connection to the Internet by way of the switching station 15 or 25.

In step S33, the starting side of the WAP portal 100 is requested, and in step S34, a log-in protocol is processed. In step S35, it is then checked whether the connection to the portal is established, and if not, a branching takes place to step S36 in which is checked whether a log-in repetition has already taken place. If not, the process returns to step S33, where a second log-in is attempted, as required. If so, on the other hand, the program branches to point S100 and thereby returns to block B6 in FIG. 3.

If the answer in step S35 is "yes" (a connection to the portal has been established), the program branches to step S37 in which it is checked whether new first, indirect access data are required. This is not so in the present example, because the connection was established by way of first, indirect access data D1. However, if it was determined at the start of the procedure that no first access data for the first, indirect access mode IA are present, this fact is automatically reported to the portal (for example, in the starting message), and the program then branches to step S40 in which a request for the first access data takes place. If the first access data are present, as in the present example, the program moves to step S39 in which a password input takes place.

Figure 5:
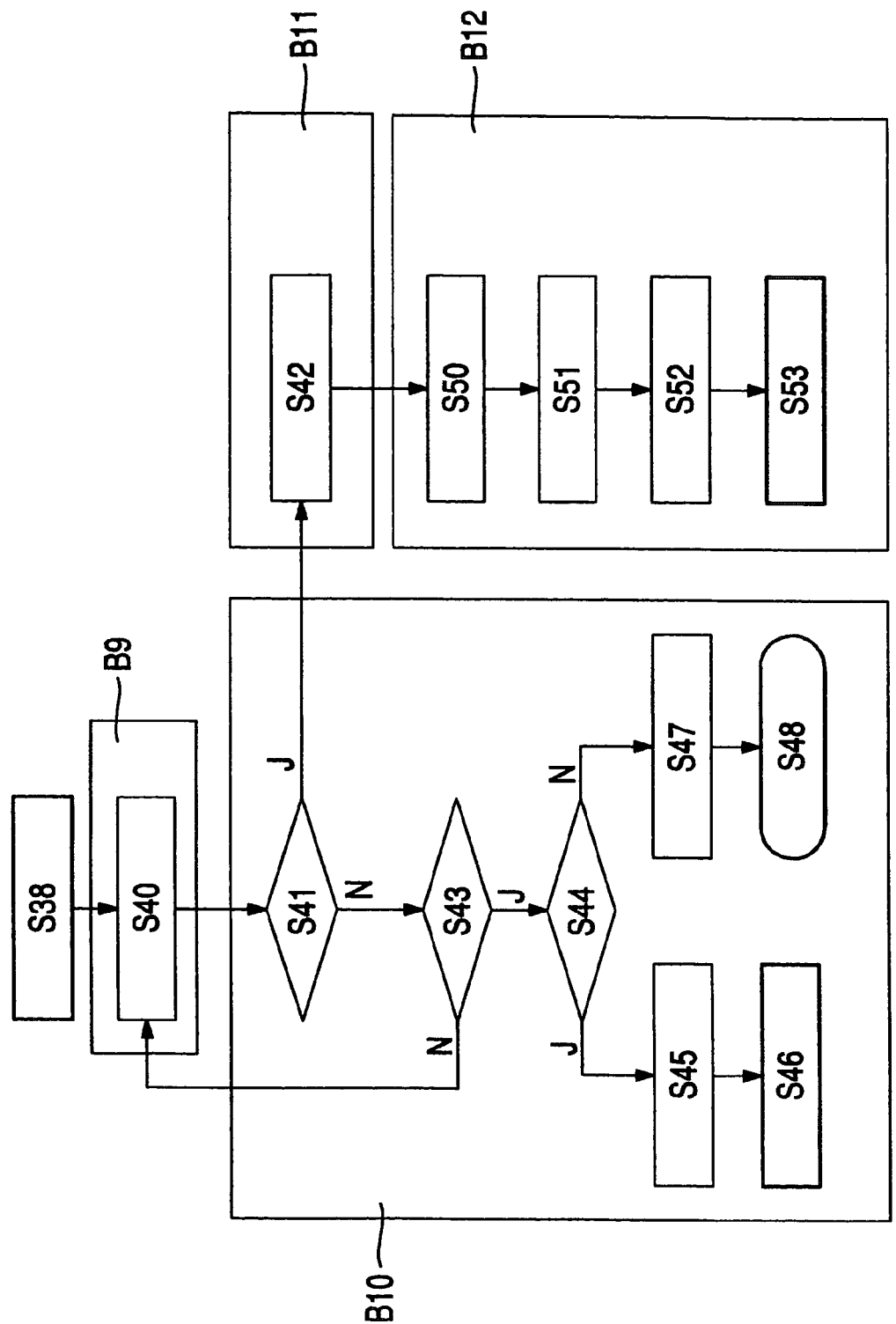
FIG. 5 shows the further course of the process for making available first access data for the described embodiment.

FIG. 5 shows the further course of the process for providing the first access data for the described embodiment. The program flow according to FIG. 5 can be divided into blocks B9 to B12.

In block B9, step S40, a corresponding request of first access data takes place from the subscriber station 1 to the service provider station 75, in which case it is indicated for which network account first access data are required (e.g., for which network provider in which country). As mentioned above, this takes place automatically if it was decided in step S9 that no appropriate first access data are present.

In the subsequent step S47 of block B10, it is checked whether corresponding first access data were received in the subscriber station 1. If so, the program branches to step S42 of block B11 in which the received first access data are stored and, if necessary, older first access data are overwritten. The latter may be necessary if the table 2*a* for the storage device 2 has a limited capacity. Overwriting can take place, for example, according to the FIFO principle.

Subsequently, the program branches to step S50 of block B12 in which the connection to the WAP portal 100 is interrupted, after which, in step S51, the mobile network connection is interrupted. In step S52, the received and stored first access data are then used, after which the program branches to step S9 in FIG. 2. In other words, the expensive second, direct access mode DA is interrupted as soon as corresponding first access data are present for the current mobile network provider, and an attempt is immediately made to dial in in step S9 and beyond, using the received and stored first access data.

If the answer in step S41 is negative (no requested first access data are received in step S41), the program continues to step S43, in which it is checked whether two request repetitions have taken place. If not, a first or a second request repetition take place by the return to step S40. If all request repetitions are unsuccessful, the program moves along to step S44.

In step S44, the user of the subscriber station 1 is asked by the system whether he wants to use the second access data for establishing a connection with the service provider station 75. If the answer is "yes", the use of the second access data D is defined in step S45, and the program returns to step S9 of FIG. 2. If the answer in step S44 is "no", on the other hand, the user is informed in step S47 that the establishment of a connection is not possible, and the browser is stopped in step S48.

Figure 6:
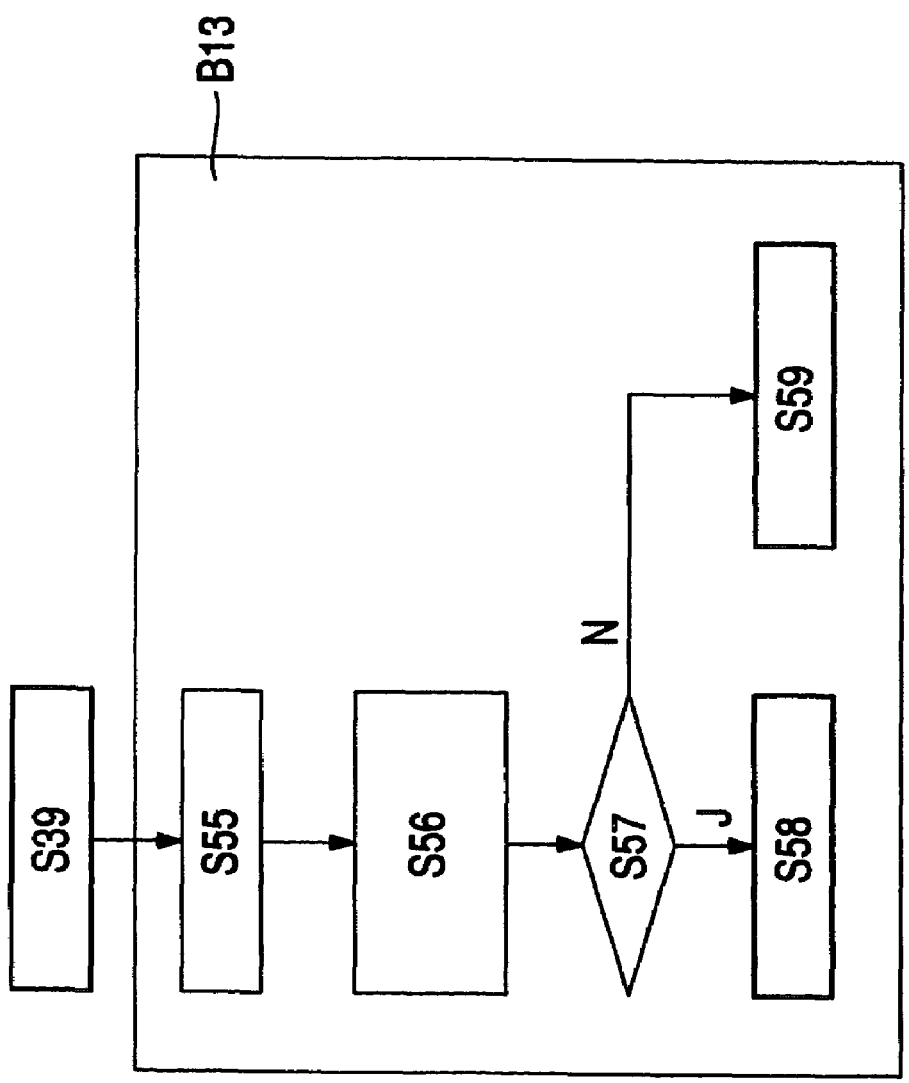
FIG. 6 shows the further process steps where a connection with the WAP portal is established, and no new first access data are required.

FIG. 6 shows further process steps in case a connection is established with the WAP portal and no new first access data are required. The program then runs starting from step S37, in which as password input takes place, to step S55 in which the log-in side of the WAP portal 100 is indicated. Subsequently, a log-in takes place at the portal indicating a user name and a password which are put in manually, for example, by the user. In step S57, it was checked whether the log-in was successful and, if so, the starting side of the WAP portal 100 is transmitted and indicated in step S58. If it is decided in step S56 that the log-in was not successful, an error report is transmitted and indicated in step S59.

The invention is not limited to the hardware configuration indicated as an example, but can be used for arbitrary networks and terminals or stations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for providing first access data to a transportable subscriber station, for establishing a first access mode to a service provider station via a first network using a network account which can be selected by the subscriber station, a first switching station and a second network; wherein, a second access mode can be established, by means of stored second access data, via the first network and a fixedly defined second switching station; said method comprising:
   the subscriber station selecting a network account;
   checking whether first access data for the selected network account are stored in the subscriber station;
   if first access data are stored in the subscriber station, requesting the first access mode to the service provider station by means of the first access data;
   if first access data are not stored in the subscriber station, requesting the second access mode to the service provider station by means of the stored second access data and requesting first access data for the selected network account in the second access mode;
   transmitting the requested access data for the selected network account to the subscriber station in the second access mode; and
   storing the transmitted first access data for the selected network account in the subscriber station.

2. The process according to claim 1, wherein the first access mode can be provided by establishing a first connection from the subscriber station to the first switching station by way of the first network and establishing a second connection from the first switching station to the service provider station by way of a second network by means of the first access data.

3. The process according to claim 1, wherein the second access mode is provided by:
   establishing a third connection from the subscriber station to the second switching station via the first network; and
   establishing a fourth connection from the second switching station to the service provider station by means of the second access data.

4. The process according to claim 1, wherein the first network is a mobile telephone network.

5. The process according to claim 4, wherein the first access data include a mobile telephone number.

6. The process according to claim 5, wherein the first switching station is a switching station of a network provider that provides a network account which can be dialed by way of the mobile telephone number.

7. The process according to claim 5, wherein:
   the subscriber station is situated in a motor vehicle;
   the second access data include a mobile telephone number; and
   the second switching station is a switching station of a motor vehicle manufacturer, which can be dialed by way of the mobile telephone number.

8. The process according to claim 5, wherein: the process is automatically implemented after the insertion of a SIM card and log-in into a telephone network.

9. The process according to claim 1, wherein the second network is a global computer network.

10. The process according to claim 9, wherein the first access data include an address for accessing a site on the global computer network.

11. The process according to claim 10, wherein the first access data includes a user identification and a password.

12. The process according to claim 1, wherein immediately after storage of the transmitted first access data for the selected network account in the subscriber station, the second access mode is interrupted, and a request is made to the service provider station by means of the first access data, to establish the first access mode.

13. The process according to claim 1, wherein after occurrence of at least one defined error during requesting of the first access mode to the service provider station using the first access data, the first access data is erased, and a new request is made for first access data for a selected network account, in the second access mode.

14. The process according to claim 1, wherein first data are stored in a first storage device, in the form of a table memory which can store a defined number of sets of first access data.

15. The process according to claim 14, wherein the table memory is populated according to the FIFO principle.

16. The process according to claim 14, wherein:
   respective expiration dates are automatically assigned to the sets of first access data; and
   the respective data sets are automatically canceled on their expiration date.

17. The process according to claim 16, wherein the respective expiration dates are determined as a function of the first access data.

18. The process according to claim 1, wherein the same first access data are provided for different network accounts of the same network provider.

\* \* \* \* \*